(12) United States Patent
Chai et al.

(10) Patent No.: US 10,339,400 B1
(45) Date of Patent: Jul. 2, 2019

(54) TRAFFIC LIGHT DETECTION USING MULTIPLE CAMERAS

(71) Applicants: Chongqing Jinkang New Energy Automobile Co., Ltd., Chongqing (CN); SF Motors Inc., Santa Clara, CA (US)

(72) Inventors: Huajun Chai, Santa Clara, CA (US); Chen Cui, Santa Clara, CA (US); Ke Huang, Santa Clara, CA (US); Fan Wang, Santa Clara, CA (US); Yifan Tang, Santa Clara, CA (US)

(73) Assignees: CHONGQING JINKANG NEW ENERGY AUTOMOBILE CO., LTD., Chongqing (CN); SF MOTORS INC., Santa Clara, CA (US)

( * ) Notice: Subject to any disclaimer, the term of this patent is extended or adjusted under 35 U.S.C. 154(b) by 0 days.

(21) Appl. No.: 16/223,114

(22) Filed: Dec. 18, 2018

(51) Int. Cl.
*G06K 9/00* (2006.01)
*G05D 1/02* (2006.01)
*G06T 7/70* (2017.01)
*B60R 1/00* (2006.01)

(52) U.S. Cl.
CPC ............ *G06K 9/00825* (2013.01); *B60R 1/00* (2013.01); *G05D 1/0246* (2013.01); *G06T 7/70* (2017.01); *B60R 2300/105* (2013.01); *B60R 2300/404* (2013.01); *G05D 2201/0213* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 2008/0187318 A1* | 8/2008 | Osanai | H04B 10/1141 398/129 |
| 2011/0095908 A1* | 4/2011 | Nadeem | B60H 3/00 340/905 |
| 2013/0088578 A1* | 4/2013 | Umezawa | G08G 1/166 348/47 |
| 2015/0046038 A1* | 2/2015 | Kawamata | B60W 30/09 701/41 |
| 2015/0183433 A1* | 7/2015 | Suzuki | B60W 30/16 701/96 |
| 2015/0360692 A1* | 12/2015 | Ferguson | G05D 1/0231 701/23 |
| 2017/0120923 A1* | 5/2017 | Rovik | B60W 30/18154 |
| 2018/0137379 A1* | 5/2018 | Oki | G08G 1/16 |
| 2018/0285664 A1* | 10/2018 | Satyakumar | G06K 9/00825 |
| 2018/0365991 A1* | 12/2018 | Yamanoi | H04N 5/225 |

* cited by examiner

*Primary Examiner* — Shervin K Nakhjavan
(74) *Attorney, Agent, or Firm* — Kilpatrick Townsend & Stockton, LLP

(57) ABSTRACT

Various arrangements for imaging a traffic light are presented. A distance to the traffic light from a vehicle may be determined. A camera mode may be selected based on the determined distance to the traffic light. One or more images from one or more cameras may be captured and received based on the selected camera mode. A state of the traffic light within the one or more received images may then be determined. The vehicle may then be driven autonomously based on the determined state of the traffic light.

20 Claims, 6 Drawing Sheets

TRAFFIC LIGHT DETECTION USING MULTIPLE CAMERAS

CROSS-REFERENCES TO RELATED APPLICATIONS

This Application is related to U.S. patent application Ser. No. 16/216,731, entitled "Fusion-Based Traffic Light Recognition for Autonomous Driving,", filed on Dec. 11, 2018, the entire disclosure of which is hereby incorporated by reference for all purposes.

BACKGROUND

For autonomous driving systems and driver-assistance systems to safely pilot vehicles, the systems may need to be able to determine the current state of road conditions with a high degree of accuracy, including conditions that were initially intended for use by a human. For example, throughout the world, traffic lights are used to determine whether a vehicle is permitted to proceed into an intersection or is required to stop before entering the intersection. An autonomous driving system or driver-assistance system controlling the vehicle may need to successfully identify such traffic lights and determine the state of a traffic light in order to safely control the vehicle in the vicinity of the intersection. While recognizing a traffic light and determining the state of a traffic light with a high degree of accuracy is needed, power consumption by an autonomous driving system is also a concern, especially when such a system is installed on an electric vehicle.

SUMMARY

Various embodiments are described related to a method for imaging a traffic light. In some embodiments, a method for imaging a traffic light is described. The method may include determining, by an on-vehicle processing system, a distance to the traffic light. The on-vehicle processing system may be installed on a vehicle. The method may include selecting, by the on-vehicle processing system, a camera mode based on the determined distance to the traffic light. The method may include receiving, by the on-vehicle processing system, one or more images from one or more cameras based on the selected camera mode. The method may include determining, by the on-vehicle processing system, a state of the traffic light within the one or more received images. The method may include driving, by the on-vehicle processing system, the vehicle based on the determined state of the traffic light.

Embodiments of such a method may include one or more of the following features. The method may include causing, by the on-vehicle processing system, a first camera to be supplied with power based on the selected camera mode. The method may include causing, by the on-vehicle processing system, a second camera to be disconnected from power. The camera mode may be selected from the group consisting of a first camera mode in which a long-range camera may be used as the first camera to capture the one or more images. The method may include a second camera mode in which a short-range camera may be used as the first camera to capture the one or more images. Selecting the camera mode based on the determined distance to the traffic light may be based on comparing the determined distance to a stored threshold distance. The long-range camera may be a thirty degree field-of-view camera and the short-range camera may be a sixty degree field-of-view camera. The camera mode may be selected from the group consisting of a first camera mode in which a long-range camera may be used to capture the one or more images. The method may include a second camera mode in which a short-range camera may be used to capture the one or more images. The method may include a third camera mode in which the long-range camera and the short-range camera may be used to capture the one or more images. Selecting the camera mode based on the determined distance to the traffic light may be based on comparing the determined distance to a first stored threshold distance and a second stored threshold distance. The third camera mode may be selected when the determined distance may be between the first stored threshold distance and the second stored threshold distance. The determined distance may be between the first stored threshold distance and the second stored threshold distance. The method may further include, based on the third camera mode being selected, rescaling, by the on-vehicle processing system, a first image of the one or more images captured using the short-range camera to match a region included in a second image of the one or more images captured using the long-range camera. Determining the state of the traffic light within the one or more images may include analyzing the rescaled first image of the one or more images to determine the state of the traffic light. The method may include analyzing the second image of the one or more images to determine the state of the traffic light. Determining the state of the traffic light within the one or more images may further include performing, by the on-vehicle processing system, a fusion process based on the state of the traffic light based on analyzing the rescaled first image and the state of the traffic light based on analyzing the second image.

In some embodiments, a system for imaging a traffic light is described. The system may include a short-range camera having a first field-of-view. The short-range camera may be installed on a vehicle. The system may include a long-range camera having a second field-of-view that may be narrower than the first field-of-view. The long-range camera may be installed on the vehicle and the first field-of-view overlaps the second field-of-view. The system may include an on-vehicle processing system, comprising one or more processors, that may receive images from the short-range camera and the long-range camera. The on-vehicle processing system may be configured to determine a distance to the traffic light. The on-vehicle processing system may be installed on the vehicle. The system may be configured to select a camera mode based on the determined distance to the traffic light. The system may be configured to receive one or more images from the long-range camera, the short-range camera, or both based on the selected camera mode. The system may be configured to determine a state of the traffic light within the one or more received images. The system may be configured to cause the vehicle to be driven based on the determined state of the traffic light.

Embodiments of such a system may include one or more of the following features. The on-vehicle processing system may be further configured to cause the short-range camera to be supplied with power based on the selected camera mode. The system may be further configured to cause the long-range camera to be disconnected from power. The camera mode may be selected from the group consisting of a first camera mode in which the long-range camera may be used to capture the one or more images. The system may include a second camera mode in which the short-range camera may be used to capture the one or more images. Selecting the camera mode based on the determined distance to the traffic light may be based on comparing the determined distance to a stored threshold distance. The long-range camera may be a thirty degree field-of-view camera and the short-range camera may be a sixty degree field-of-view camera. The camera mode may be selected from the group consisting of a first camera mode in which the long-range camera may be used to capture the one or more images. The system may include a second camera mode in which the short-range camera may be used to capture the one or more images. The system may include a third camera mode in which the long-range camera and the short-range camera may be used to capture the one or more images. Selecting the camera mode based on the determined distance to the traffic light may be based on the on-vehicle processing system being configured to compare the determined distance to a first stored threshold distance and a second stored threshold distance. The third camera mode may be selected when the determined distance may be between the first stored threshold distance and the second stored threshold distance. The determined distance may be between the first stored threshold distance and the second stored threshold distance. The on-vehicle processing system may be further configured to rescale a first image of the one or more images captured using the short-range camera to match a region included in a second image of the one or more images captured using the long-range camera based on the third camera mode being selected. The on-vehicle processing system being configured to determine the state of the traffic light within the one or more images may include the on-vehicle processing system being configured to analyze the rescaled first image of the one or more images to determine the state of the traffic light. The system may be configured to analyze the second image of the one or more images to determine the state of the traffic light.

DETAILED DESCRIPTION

For autonomous driving systems, it is important to identify traffic lights and determine the state of a traffic light (e.g., whether the traffic light is green, yellow, red, etc.) both when the traffic light is nearby (e.g., the vehicle is stopped waiting to enter an intersection at which the traffic light is located) and when the traffic light is in the distance (e.g., a vehicle is approaching an intersection at which traffic is controlled by the traffic light). In order to accurately recognize a traffic light and determine the state of the traffic light, having multiple cameras onboard a vehicle may be beneficial. A short-range camera may be used when the traffic light is expected to be nearby the vehicle and a long-range camera may be used when the traffic light is expected to be a distance from the vehicle.

While multiple cameras may be used to capture different views of an environment of a vehicle, use of such multiple cameras may consume a significant amount of power. Such power consumption may be particularly concerning in an electric vehicle that relies on batteries for onboard power. To decrease power usage, multiple camera modes may be used. Depending on a determined distance between the vehicle and the expected location of a traffic light (or the intersection at which the traffic light is located), a subset of the available cameras may be activated.

In other embodiments, a camera mode may be available at which multiple cameras, such as a short-range camera and a long-range camera, are activated. Such a camera mode may be used when the distance between the vehicle and the traffic light is within a range at which neither the short-range camera nor long-range camera is typically superior in capturing images of the traffic lights. For instance, a long-range camera may capture a more detailed view of a smaller field-of-view, but the short-range camera may capture a larger field-of-view that includes more traffic lights located at the intersection. However, a short-range camera may capture an image that results in traffic lights being detected late since the traffic light may only be discernable at a close distance. When images are captured using multiple cameras, images from at least one of the cameras may be rescaled. Both sets of images may be analyzed to determine a state of the vehicle. In some embodiments, a fusion process may be performed to combine or fuse the traffic light classifications derived from the images received from the multiple cameras.

Figure 1:
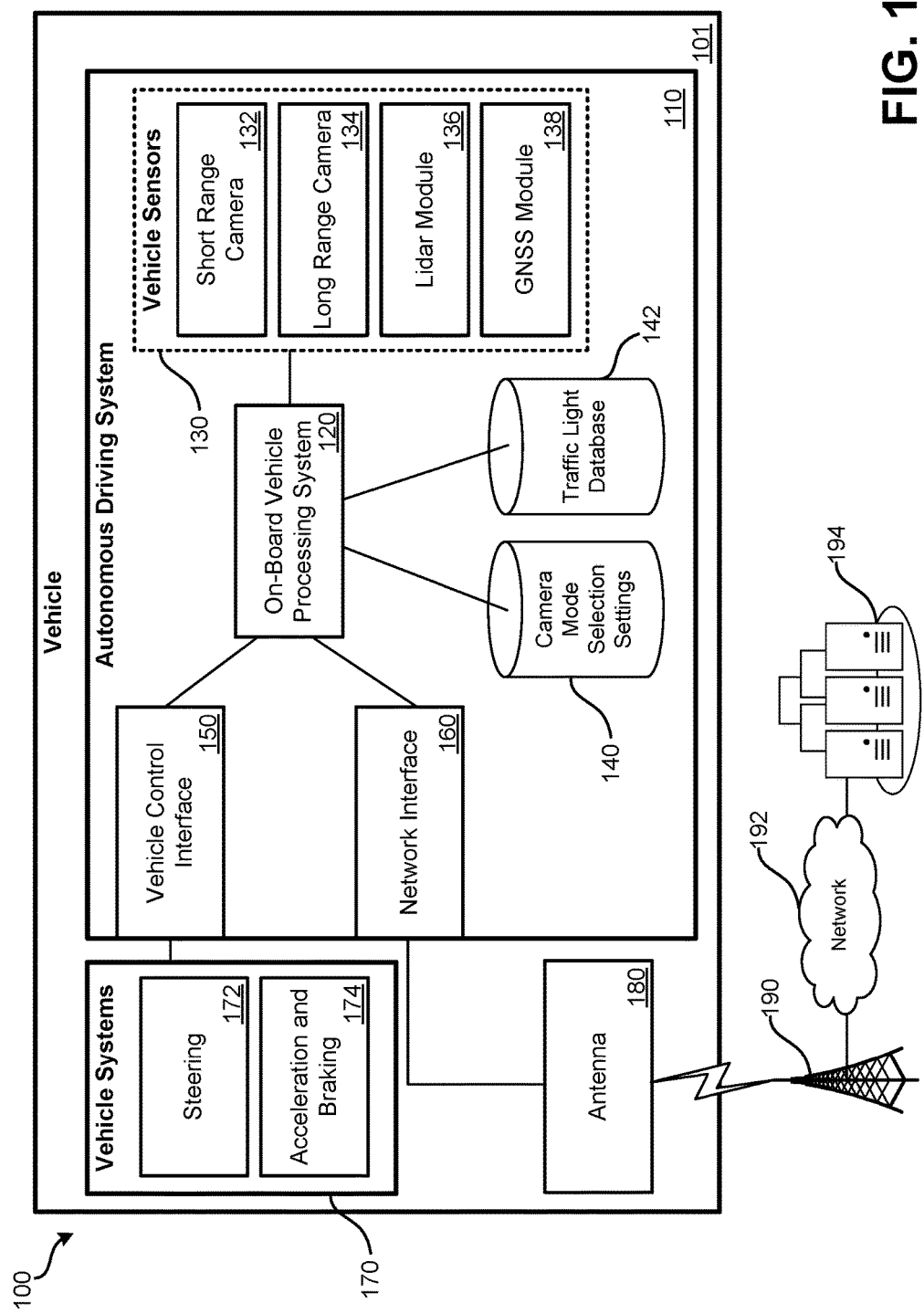
FIG. 1 illustrates a block diagram of an embodiment of an autonomous driving system.

Further detail regarding such embodiments and additional embodiments is provided in relation to the figures. FIG. 1 illustrates a block diagram of an embodiment of an autonomous vehicle driving system 100. An "autonomous driving system" refers to a system that can drive or pilot a vehicle for a period of time without human input being needed to control the vehicle. The systems and methods detailed herein may also be used in the form of a "driver-assistance system." A driver-assistance system may perform at least some of the tasks that are typically performed by a human driver or serve as a safety failsafe for situations in which a human driver has performed a likely mistaken or incorrect action while driving (e.g., failing to brake for a red traffic light, drifting out of a lane, failing to stop at an appropriate distance from an obstacle or stopped vehicle in the path of the driver's vehicle). Autonomous vehicle driving system 100 may include: vehicle 101; autonomous driving system 110; vehicle systems 170; antenna 180; cellular network 190; network 192; and cloud-based server system 194.

Vehicle 101 can refer to various forms of vehicles that can be controlled by an onboard autonomous driving system (or onboard driver-assistance system). Vehicle 101 may be a passenger car, pickup truck, sport utility vehicle, truck, motorized cart, all-terrain vehicle, motorcycle, powered scooter, or some other form of powered vehicle. Such a vehicle may be legal to operate on public roadways. Such vehicles may be configured to be controlled by a human driver (hereinafter a "driver"), an autonomous driving system (or driver-assistance system), or both. Therefore, at least in some vehicles, a driver may control the vehicle, while at other times the autonomous driving system may control the vehicle. Vehicle 101 may include vehicle systems 170. Vehicle systems 170 may include steering system 172 and acceleration and braking system 174. Each of these systems may be, at least at times, controlled using autonomous driving system 110. Other vehicle systems may also be present that may be, at least some of the time, controlled using autonomous driving system 110, such as a signaling system that indicates turns and lane changes of vehicle 101, and a lighting system to illuminate a roadway and to make vehicle 101 more visible.

Autonomous driving system 110 may include various sensors and computerized components that execute or function as various components detailed in FIG. 1. Such sensors and components can include: onboard vehicle processing system 120; vehicle sensors 130 (short-range camera 132, long-range camera 134, Lidar (Light Detection and Ranging) module 136; and GNSS (global navigation satellite system) module 138); camera mode selection settings 140; traffic light database 142; vehicle control interface 150; and network interface 160.

As part of vehicle sensors 130, a short-range camera 132 may be present. Short-range camera 132 may be a visible light camera that has a field-of-view of the environmental scene in front of vehicle 101. Short-range camera 132 may include a wide-angle lens that results in a wide field-of-view, such as a 60° field-of-view. Short-range camera 132 may be especially useful for capturing an image that includes a large portion of the scene in front of the vehicle such as traffic lights nearby the vehicle. Short-range camera 132 may be less useful for capturing details of objects, including traffic lights, in the distance. Therefore, it may be hard to perform an object recognition process to detect the presence of a traffic light in the distance using an image captured using wide-area camera 132.

Figure 3A:
FIG. 3A illustrates an embodiment of an image captured using a short-range camera.
Figure 3B:
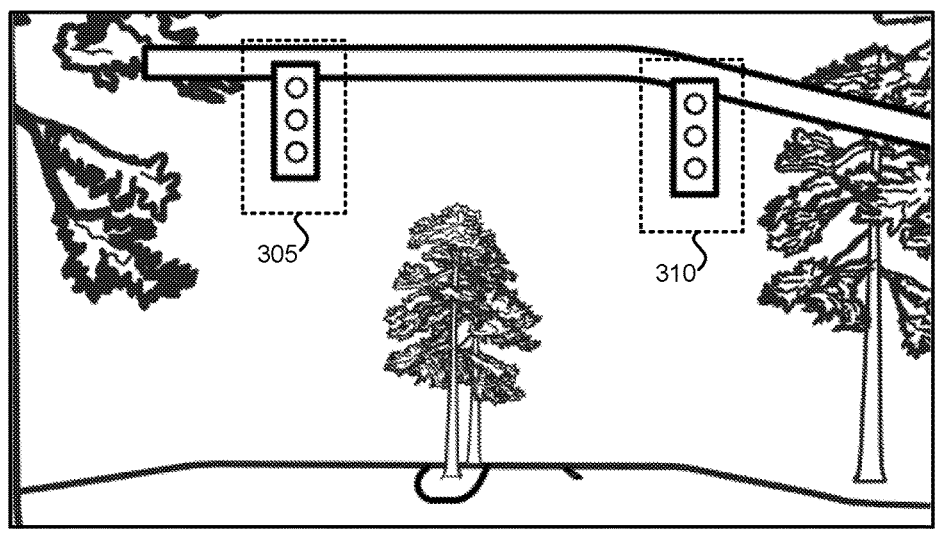
FIG. 3B illustrates an embodiment of an image captured using a long-range camera.
Figure 4:
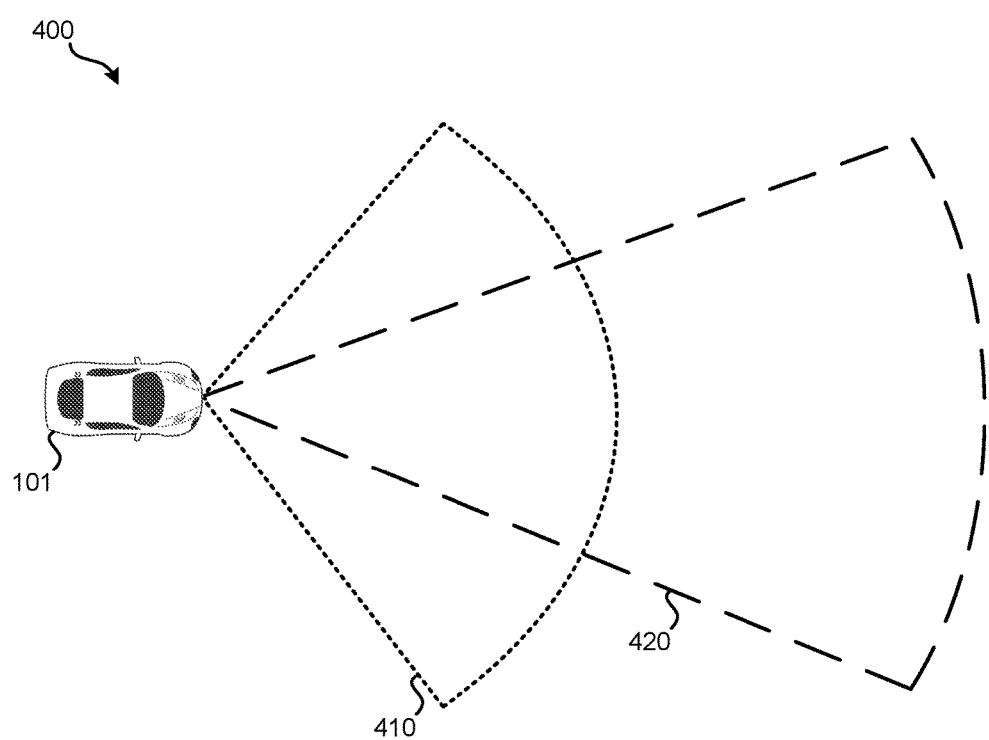
FIG. 4 illustrates an embodiment of a vehicle equipped with a short-range camera and a long-range camera.

Long-range camera 134 may also be a visible light camera that also has a field-of-view of the scene in front of vehicle 101 (which overlaps the field-of-view of short-range camera 132). However, long-range camera 134 may include a narrow-angle lens that produces a narrow field-of-view (e.g., 30° field-of-view) and provides optical and/or digital magnification greater than short-range camera 132. Therefore, long-range camera 134 may be especially useful for capturing an image that includes details of objects (e.g., a traffic light) in the distance in front of vehicle 101, but has a narrower field-of-view than short-range camera 132. The relationship between long-range camera 134 and short-range camera 132 are illustrated in FIGS. 3A, 3B, and 4. While FIG. 1 illustrates only two cameras as part of vehicle sensors 130, additional cameras having additional, different fields-of-view and, possibly, pointed in different directions may be present. For example, additional cameras may include environmental scenes to the sides and rear of the vehicle. Similarly, such cameras may have different fields of view. Further, such additional cameras may capture electromagnetic radiation other than visible light, such as infrared light and ultraviolet light.

Vehicle sensors other than cameras may be present. For example, a Lidar module 136 may be used to determine the distance to objects in the environment of vehicle 101. Other forms of sensors may additionally or alternatively be present, such as a radar module, ultrasound sensor module, etc. GNSS Module 138 may use one or more GNSS satellite systems to determine a precise location of vehicle 101. GNSS Module 138 may use GPS, GLONASS, Galileo, BeiDou (BDS) or some other form of navigation satellite system to determine a location of vehicle 101. Other sensors such as a rain sensor, and light sensor may be present. For example, a GPS sensor may be used to determine a distance from vehicle 101 to a traffic light and what country, state, county, region, or geographic region a vehicle is located in. Regardless of which sensors are present, vehicle sensors 130 may transmit captured images and/or data to onboard vehicle processing system 120 for processing.

Onboard vehicle processing system 120 may receive data from vehicle sensors 130 and may control vehicle systems 170 through vehicle control interface 150. Onboard vehicle processing system 120 may further communicate with cloud-based server system 194 through network interface 160. Onboard vehicle processing system 120 may access one or more databases or data stores of data that are stored locally as part of autonomous driving system 110 using one or more non-transitory processor-readable mediums, which can include memories, hard drives, and solid-state drives. Onboard vehicle processing system 120 may include various computerized components, such as one or more processors and communication busses. The one or more processors used as part of onboard vehicle processing system 120 may include one or more specific-purpose processors that have various functionality hardcoded as part of the one or more processors, such as an application-specific integrated circuit (ASIC). Additionally or alternatively, one or more general-purpose processors may be used, as part of onboard vehicle processing system 120, that execute stored instructions that cause the general-purpose processors to perform specific-purpose functions. Therefore, software and/or firmware may be used to perform at least some of the functions of onboard vehicle processing system 120. Further detail regarding the functioning of onboard vehicle processing system 120 is provided in relation to FIG. 2.

Vehicle control interface 150 and network interface 160 may serve to facilitate communications with onboard vehicle processing system 120. Vehicle control interface 150 may translate instructions or signals from onboard vehicle processing system 120 to control steering system 172, acceleration and braking system 174, and/or other onboard vehicle systems. Feedback from vehicle systems 170 (e.g., RPM, vehicle speed, engine status) may be provided by vehicle control interface 150 to onboard vehicle processing system 120. Network interface 160 may be used to facilitate communication between onboard vehicle processing system 120 and various external sources. In some embodiments, network interface 160 uses antenna 180 to wirelessly communicate with cellular network 190, which may be a 3G, 4G, 5G, or some other form of wireless cellular network. Cellular network 190 may use one or more networks 192, which can include the Internet, to communicate with a remote cloud-based server system 194. Cloud-based server system 194 may be operated by an entity that provides data to and receives data from autonomous driving system 110. For instance, cloud-based server system 194 may be operated by (or have operated on its behalf) a manufacturer or provider of autonomous driving system 110. Therefore cloud-based server system 194 may communicate with a large number (e.g., thousands) of autonomous driving systems 110 deployed in geographically-scattered vehicles. Network interface 160 may also be able to communicate with other forms of wireless networks. For instance, network interface 160 may be used to communicate with a wireless local area network (WLAN), such as a Wi-Fi network to which autonomous driving system 110 has permission to access. For example, when parked at a home, vehicle 101 may be within range of a vehicle owner's Wi-Fi network, through which the Internet and cloud-based server system 194 may be accessed. Other forms of network-based communication with cloud-based server system 194 are possible, such as a Bluetooth communication link via a vehicle occupant's mobile device to a cellular network or WLAN.

Camera mode selection settings 140 may store settings, using a non-transitory processor-readable medium, that are used to determine which camera mode is to be used in particular situations. Camera mode selection settings 140 may store one or more distance thresholds that are used to determine which camera mode should be used for determining the state of a traffic light. In some embodiments, in addition to defining distance thresholds, other characteristics may be stored that indicate which camera mode is to be used, such as: geographic or geopolitical region; time of day; and weather.

Traffic light database 142 may indicate the location of where known traffic lights are located using a non-transitory processor-readable medium and may indicate the possible states (e.g., red, yellow, green, left green arrow, left red arrow, etc.) of the traffic light. Using traffic light database 142, onboard vehicle processing system 120 can identify intersections and other locations at which a traffic light can be expected to be present. Traffic light database 142 may include coordinates of known traffic lights. Traffic light database 142 may be updated by cloud-based server system 194. Using the location (and, possibly, heading) of the vehicle determined using GNSS module 138, along with data from traffic light database 142, the distance to a traffic light or the distance to an intersection at which a traffic light is located can be determined.

Figure 2:
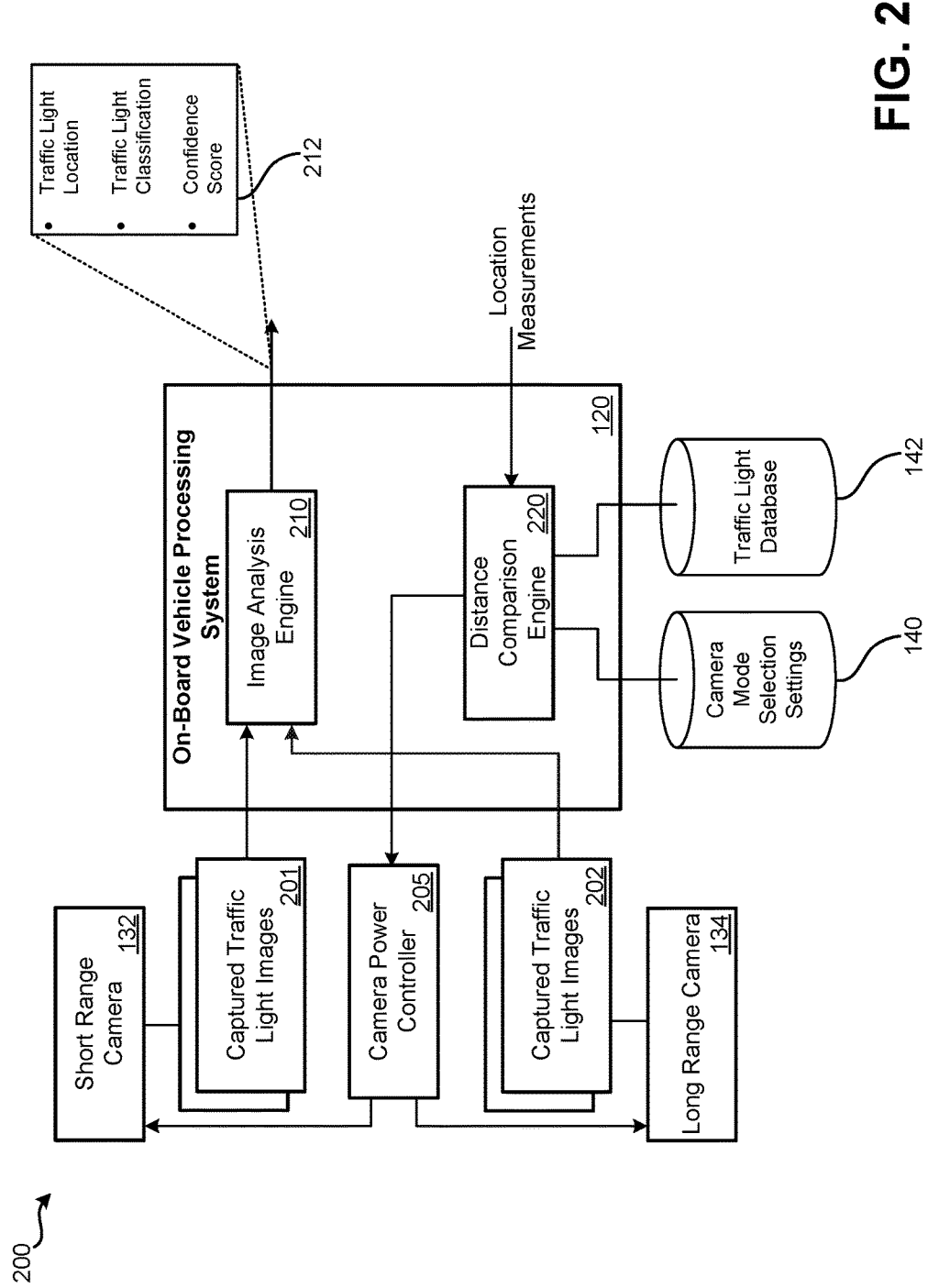
FIG. 2 illustrates a block diagram of an embodiment of an onboard vehicle processing system of an autonomous driving system.

FIG. 2 illustrates a block diagram of an embodiment 200 of an onboard vehicle processing system 120 of an autonomous driving system. Onboard vehicle processing system 120 may function as part of the autonomous driving system of FIG. 1 or may function as part of another form of autonomous driving system or driver-assistance system. Onboard vehicle processing system 120 may include various components, including: image analysis engine 210 and distance comparison engine 220. Onboard vehicle processing system 120 may communicate with a short-range camera 132; long-range camera 134; camera power controller 205; camera mode selection settings 140; and traffic light database 142. Onboard vehicle processing system 120 may receive location measurements, such as from GNSS module 138. As previously detailed, onboard vehicle processing system 120 may include various special-purpose or general-purpose processors. Components of onboard vehicle processing system 120 may be performed using such special-purpose or general-purpose processors. If general-purpose processors are used, the functionality of the detailed components of onboard vehicle processing system 120 may be implemented using specially-coded software that is executed by one or more general-purpose processors.

Onboard vehicle processing system 120 may receive captured traffic light images 201 from short-range camera 132. Captured traffic light images 201 may only be received when power is supplied to short-range camera 132 or short-range camera 132 is set to an active mode. Similarly, onboard vehicle processing system 120 may receive captured traffic light images 202 from long-range camera 134. Captured traffic light images 202 may only be received when power is supplied to long-range camera 134 or long-range camera 134 is set to an active mode. Whether power is supplied to short-range camera 132 and/or long-range camera 134 may be controlled using camera power controller 205. A voltage sufficient to power short-range camera 132 and/or long-range camera 134 may only be supplied by camera power controller 205 when an instruction to do so is received from onboard vehicle processing system 120. Therefore, camera power controller 205 may function as a switch that controls whether power is supplied to short-range camera 132 and/or long-range camera 134. Alternatively, camera power controller 205 may control the modes of short-range camera 132 and/or long-range camera 134. For example, short-range camera 132 and/or long-range camera 134 may be settable to a sleep mode and an active mode. While in sleep mode, significantly less power may be consumed than in active mode. Images may only be captured while a camera is in active mode.

Distance comparison engine 220 may receive location measurements from another component, such as GNSS module 138. Distance comparison engine 220 may compare the current location of the vehicle with a location of a traffic light selected from traffic light database 142. Based upon the distance determined between the location of the vehicle and the traffic light, distance comparison engine 220 may select a camera mode. Further, the camera mode may be selected based on one or more characteristics from camera mode selection settings 140. For instance, one or more threshold distances may be retrieved from camera mode selection settings 140 and used to select the camera mode. Based upon the camera mode selected, camera power controller 205 may be instructed which one or more cameras should be powered on or otherwise activated. In other embodiments, an output of onboard vehicle processing system 120 may be transmitted directly to short-range camera 132 and/or long-range camera 134 to control whether the camera is powered or otherwise activated.

Captured traffic light images 201 and captured traffic light images 202 may be received by image analysis engine 210. Image analysis engine 210 may analyze each image to determine the traffic light state of one or more traffic lights present within the received images. Multiple forms of analysis may be performed on the received images. For example, a computer vision method and deep learning method may be performed on at least some of the images to determine a state of the traffic light. Such an arrangement is detailed in U.S. patent application Ser. No. 16/216,731, entitled Fusion-Based Traffic Light Recognition for Autonomous Driving," filed on Dec. 11, 2018, the entire disclosure of which is hereby incorporated by reference for all purposes. If images are being captured by both short-range camera 132 and long-range camera 134, such a fusion-based process may be used to determine a likely state of the traffic light.

Image analysis engine 210 may provide an output that is indicative of a location of one or more traffic lights, one or more determined traffic light states, also referred to as traffic light classifications, along with a confidence score indicative of how confident image analysis engine 210 is in the traffic light classification, such as indicated by output 212. In some embodiments, the output of image analysis engine 210 is a probability of each possible traffic light classification. The possible traffic light classifications may include only traffic light classifications that are possible at a particular traffic light, which may be based on data retrieved from traffic light database 142. As an example of this, some traffic lights have red arrows, yellow arrows, and green arrows, while others do not. For traffic lights that are known to not have a particular type of light, the corresponding traffic light classifications may be excluded from being considered. In other embodiments, all possible traffic light classifications may be evaluated for each traffic light.

FIGS. 3A and 3B compare and contrast images that may be captured by short-range and long-range cameras pointed in a same direction. FIG. 3A illustrates an embodiment of an image 300A captured using a short-range camera. FIG. 3B illustrates an embodiment of an image 300B captured using a long-range camera. As can be seen, in image 300A, a wide region is visible. Within the visible region, three traffic lights are visible: traffic light 305, traffic light 310, and traffic light 315. Further, in image 300B, a smaller region is visible, but in greater detail. Within the visible region of image 300B, only two traffic lights 305 and 310 are visible, but are imaged in greater detail. In the embodiments of FIGS. 3A and 3B, each of these images may be useful for different reasons: image 300A provides a more complete image of traffic lights at the intersection while image 300B provides a more detailed image of the traffic lights directly in front of the vehicle.

FIG. 4 illustrates an embodiment 400 of a vehicle equipped with a short-range camera and a long-range camera, such as vehicle 101. The short-range camera may have field-of-view 410, thus allowing it to image objects in a wider field-of-view. The long-range camera may have field-of-view 420, thus allowing it to image distant objects with more detail. In some embodiments, the short-range camera has a field-of-view of 60° and the long-range camera has a field-of-view of 30°. In other embodiments, the field-of-view of both cameras may vary. In still other embodiments, a greater number of cameras may be present having greater and/or smaller fields-of-view.

Figure 5:
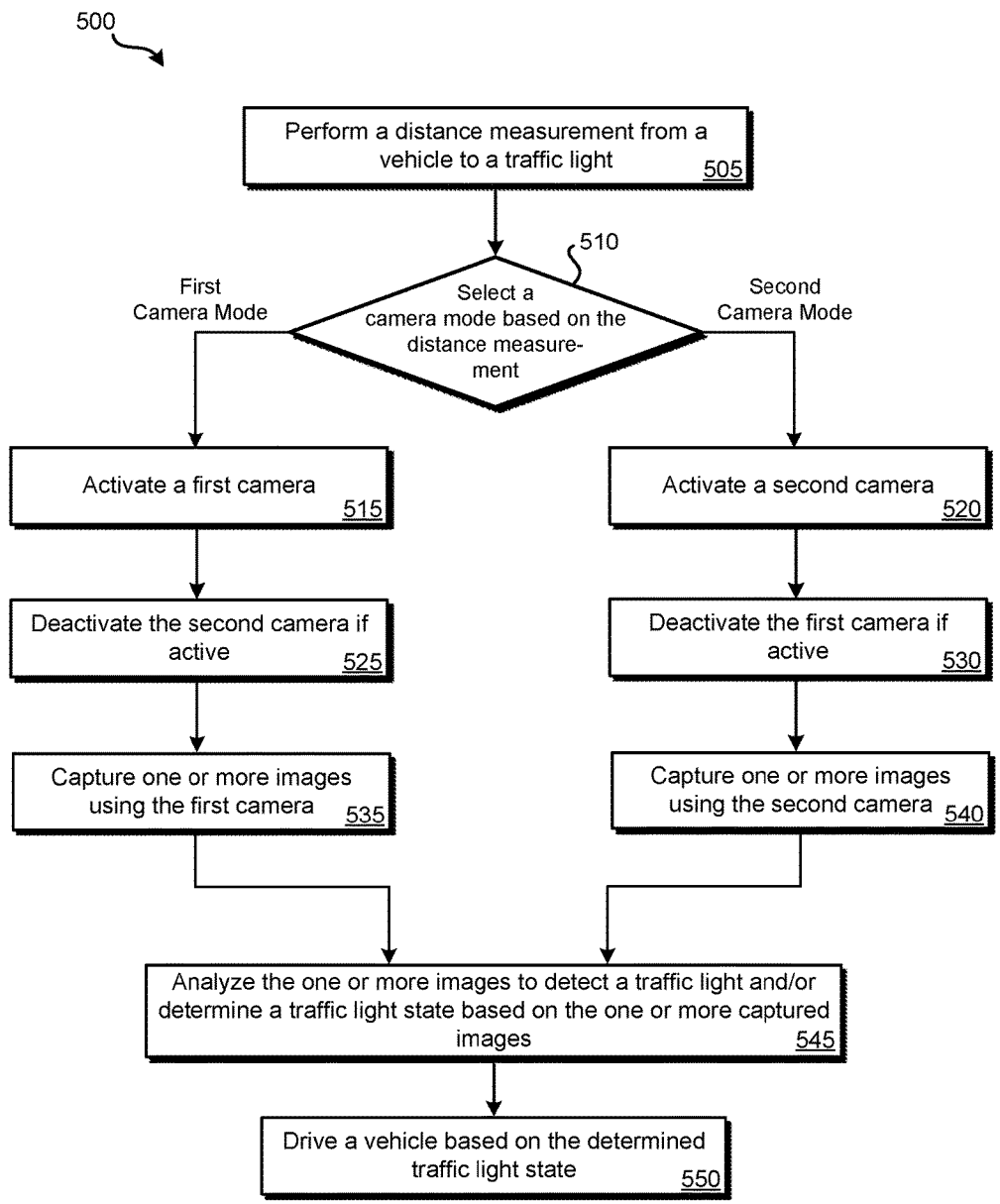
FIG. 5 illustrates an embodiment of a method for determining a state of a traffic light using two camera modes.

Various methods may be performed using the systems and devices detailed in relation to FIGS. 1-4. FIG. 5 illustrates an embodiment of a method 500 for determining a state of a traffic light using two camera modes. Method 500 may be performed by onboard vehicle processing system 120 of autonomous driving system 110 of FIG. 1. Autonomous driving system 110 may be installed on a vehicle. In other embodiments, method 500 may be performed using an alternate system or device that performs the functions of onboard vehicle processing system 120 detailed in relation to FIG. 2.

At block 505, a distance measurement from the vehicle to a traffic light or the intersection at which a traffic light is located may be determined. The distance measurement may be made by obtaining a set of location coordinates from a GNSS module, such as a GPS, GLONASS, Galileo, BDS, or some other form of navigation satellite system module. The location of the vehicle may be compared with the location of traffic lights stored in a local traffic light database to determine the distance. The location obtained from the GNSS module may also be used to determine a direction of the vehicle. In some embodiments, additional data may be used in determining the distance, such as compass heading measurements and/or accelerometer measurements. In other embodiments, the distance to a traffic light may be determined using Lidar-based distance measurements to the intersection or traffic light. In still other embodiments, a radar or camera device may detect and determine a distance to a traffic light or intersection.

At block 510, a camera mode may be selected based on the distance measurement or determined distance of block 505. In the embodiment of method 500, there are two possible camera modes: a first camera mode in which a first camera is active; and a second camera mode in which a second camera is active. In other embodiments, a greater number of camera modes may be present. Such other camera modes may involve additional numbers or cameras and/or may involve multiple cameras being activated concurrently. The selection of block 510 may be made based on comparing the distance measurement to a stored threshold distance, such as from a camera mode selection settings database. In some embodiments, the stored threshold distance is 100 meters. In other embodiments, the threshold distance may be greater or smaller. The first camera mode may be selected if the measured distance is less than the stored threshold distance. The second camera mode may be selected if the measured distance is greater than the stored threshold distance.

If the first camera mode is selected at block 510, the first camera may be activated at block 515. The first camera may be a short-range camera. The short-range camera may have a field-of-view of 60°. In other embodiments, the short-range camera may have a field-of-view of a greater or smaller angle than 60°. Activation of the first camera may involve power being supplied to the first camera, which may cause the first camera to activate and begin capturing images. In other embodiments, activation of the first camera may involve a signal being provided to the first camera that triggers the first camera to enter an active mode, such as from a sleep mode. While in the sleep mode, images may not be captured and power consumption may be relatively lower; while in the active mode, images may be captured and the power consumption may be relatively higher.

At block 525, if active, the second camera may be deactivated. Block 525 may also be conditioned on block 510 being evaluated such that the first camera mode is selected. The second camera may be deactivated by power not being supplied to the second camera or a signal being provided to the second camera that causes the camera to enter a sleep mode.

At block 535, one or more images may be captured using the first camera. Since the first camera is a short-range camera, the images captured by the first camera can be expected to include a larger region that is closer to the vehicle than the second camera, however with less detail for objects in the distance.

If the second camera mode is selected at block 510, the second camera may be activated at block 520. The second camera may be a long-range camera. The long-range camera may have a field-of-view of 30°. In other embodiments, the long-range camera may have a field-of-view of a greater or smaller angle than 30°. Regardless of the specific angle of the field-of-view, the field-of-view angle of the long-range camera is smaller than the field-of-view angle of the short-range camera. Activation of the second camera may involve power being supplied to the second camera, which may cause the second camera to activate and begin capturing images. In other embodiments, activation of the second camera may involve a signal being provided to the second camera that triggers the second camera to enter an active mode, such as from a sleep mode. While in the sleep mode, images may not be captured and power consumption may be relatively lower; while in the active mode, images may be captured and the power consumption may be relatively higher.

At block 530, if active, the first camera may be deactivated. Block 530 may also be conditioned on block 510 being evaluated such that the second camera mode is selected. The first camera may be deactivated by power not being supplied to the first camera or a signal being provided to the first camera that causes the camera to enter a sleep mode.

At block 540, one or more images may be captured using the second camera. Since the second camera is a long-range camera, the images captured by the second camera can be expected to include a smaller region that is farther from the vehicle than the first camera, however with greater detail of the captured region for objects in the distance.

At block 545, regardless of whether the first mode or the second mode was selected at block 510, the captured one or more images may be analyzed. Analyzing the images may include performing some processing on the images. Analyzing the images may include performing one or more image processing techniques to: locate one or more traffic lights present within the images; determine a state of the one or more traffic lights; and/or determine a probability that the state determination of each of the one or more traffic lights is correct.

At block 550, the vehicle may be driven at least partially based on the state of the traffic light (and, possibly, probability of the state being correct) determined at block 545. Block 550 can include autonomous driving system 110 controlling one or more vehicle system 170 through vehicle control interface 150, such as to brake and stop before an intersection (e.g., if red is the determined state of the traffic light) or continue to move into and through an intersection (e.g., if green is the determined state of the traffic light).

Figure 6:
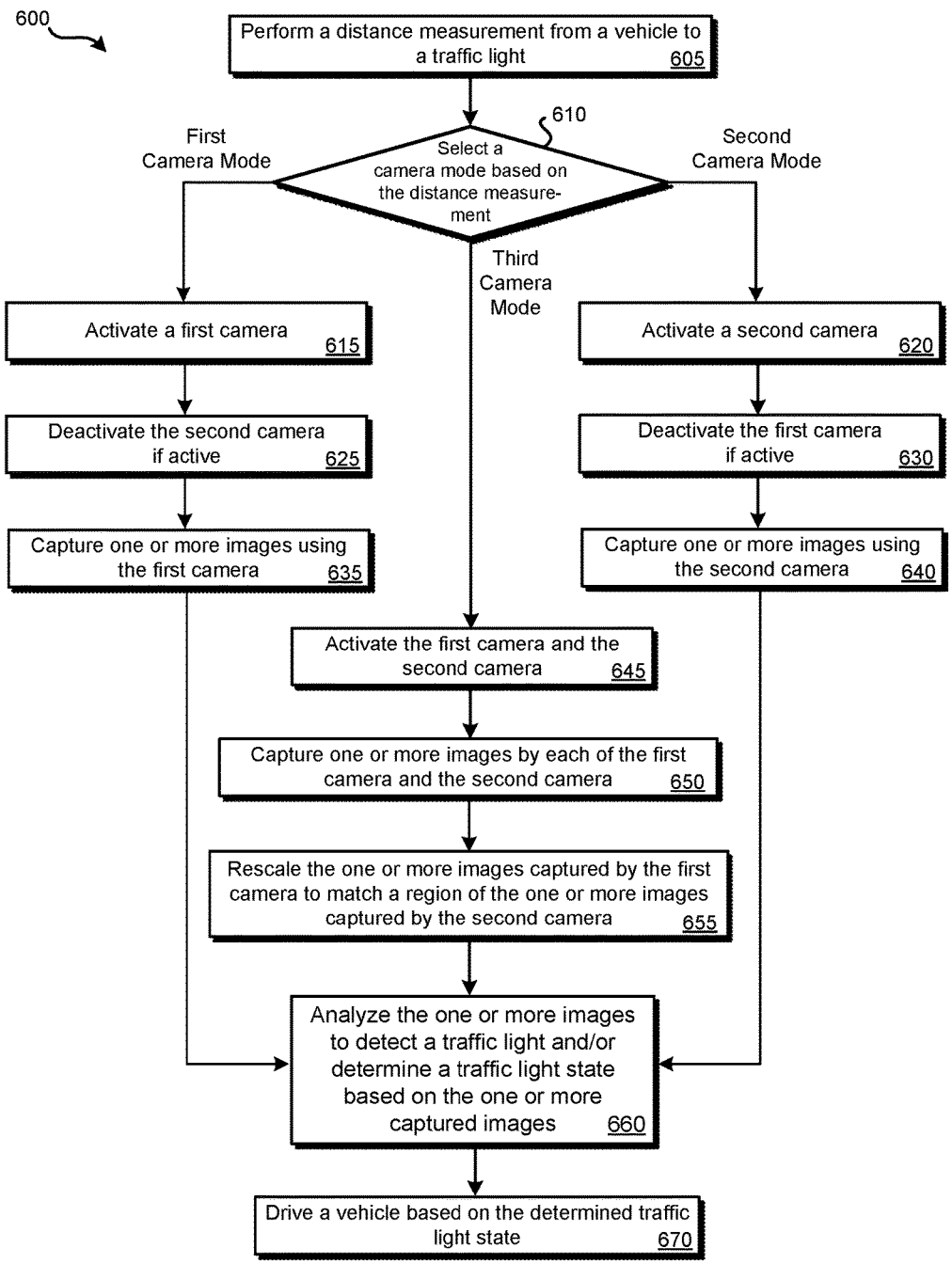
FIG. 6 illustrates an embodiment of a method for determining a state of a traffic light using three camera modes.

FIG. 6 illustrates an embodiment of a method for determining a state of a traffic light using three camera modes. Method 600 may be performed by onboard vehicle processing system 120 of autonomous driving system 110 of FIG. 1. Autonomous driving system 110 may be installed on a vehicle. In other embodiments, method 600 may be performed using an alternate system or device that performs the functions of onboard vehicle processing system 120 detailed in relation to FIG. 2. Method 600 can represent a more detailed embodiment of method 500.

At block 605, a distance measurement from the vehicle to a traffic light or the intersection at which a traffic light is located may be determined. The distance measurement may be made by obtaining a set of location coordinates from a GNSS module, such as a GPS, GLONASS, Galileo, BDS, or some other form of navigation satellite system module. The location of the vehicle may be compared with the location of traffic lights stored in a local traffic light database to determine the distance. The location obtained from the GNSS module may also be used to determine a direction of the vehicle. In some embodiments, additional data may be used in determining the distance, such as compass heading measurements and/or accelerometer measurements. In other embodiments, the distance to a traffic light may be determined using Lidar-based distance measurements to the intersection or traffic light. In still other embodiments, a radar or camera device may detect and determine a distance to a traffic light or intersection.

At block 610, a camera mode may be selected based on the distance measurement or determined distance of block 605. In the embodiment of method 600, there are three possible camera modes: a first camera mode in which a first camera is active; a second camera mode in which a second camera is active; and a third camera mode in which both the first camera and the second camera are active. In other embodiments, a greater number of camera modes may be present. Such other camera modes may involve additional numbers or cameras and/or may involve multiple cameras being activated concurrently. The selection of block 610 may be made based on comparing the distance measurement to multiple stored threshold distances, such as from a camera mode selection settings database. In some embodiments, the stored threshold distances are 50 meters and 200 meters. In other embodiments, the threshold distances may be greater or smaller. The first camera mode may be selected if the measured distance is less than a first stored threshold distance. The second camera mode may be selected if the measured distance is greater than a second stored threshold distance. The third camera mode may be selected if the measured distance is between the first and second stored threshold distances.

If the first camera mode is selected at block 610, the first camera may be activated at block 615. The first camera may be a short-range camera. The short-range camera may have a field-of-view of 60°. In other embodiments, the short-range camera may have a field-of-view of a greater or smaller angle than 60°. Activation of the first camera may involve power being supplied to the first camera, which may cause the first camera to activate and begin capturing images. In other embodiments, activation of the first camera may involve a signal being provided to the first camera that triggers the first camera to enter an active mode, such as from a sleep mode. While in the sleep mode, images may not be captured and power consumption may be relatively lower; while in the active mode, images may be captured and the power consumption may be relatively higher.

At block 625, if active, the second camera may be deactivated. Block 625 may also be conditioned on block 610 being evaluated such that the first camera mode is selected. The second camera may be deactivated by power not being supplied to the second camera or a signal being provided to the second camera that causes the camera to enter a sleep mode.

At block 635, one or more images may be captured using the first camera. Since the first camera is a short-range camera, the images captured by the first camera can be expected to include a larger region that is closer to the vehicle than the second camera, however with less detail for objects in the distance.

If the second camera mode is selected at block 610, the second camera may be activated at block 620. The second camera may be a long-range camera. The long-range camera may have a field-of-view of 30°. In other embodiments, the long-range camera may have a field-of-view of a greater or smaller angle than 30°. Regardless of the specific angle of the field-of-view, the field-of-view angle of the long-range camera is smaller than the angle of the short-range camera. Activation of the second camera may involve power being supplied to the second camera, which may cause the second camera to activate and begin capturing images. In other embodiments, activation of the second camera may involve a signal being provided to the second camera that triggers the second camera to enter an active mode, such as from a sleep mode. While in the sleep mode, images may not be captured and power consumption may be relatively lower; while in the active mode, images may be captured and the power consumption may be relatively higher.

At block 630, if active, the first camera may be deactivated. Block 630 may also be conditioned on block 610 being evaluated such that the second camera mode is selected. The first camera may be deactivated by power not being supplied to the first camera or a signal being provided to the first camera that causes the camera to enter a sleep mode.

At block 640, one or more images may be captured using the second camera. Since the second camera is a long-range camera, the images captured by the second camera can be expected to include a smaller region that is farther from the vehicle than the first camera, however with greater detail of the captured region for objects in the distance.

If the third camera mode is selected at block 610 based on the distance measurements being between the stored threshold distances, the first camera and the second camera may be activated at block 645. Activation of the cameras may involve power being supplied to the cameras, which may cause the cameras to activate and begin capturing images. In other embodiments, activation of the cameras may involve signals being provided to the cameras that trigger the cameras to enter active modes, such as from sleep modes.

At block 650, one or more images may be captured using each of the first camera and the second camera. Since both cameras are pointed in the same general direction, the field-of-view captured using the long-range camera represents a detailed view of a portion of the field-of-view captured using the short-range camera. An example of such an arrangement is illustrated in FIGS. 3A and 3B.

At block 655, the one or more images captured by the first camera (the short-range camera) may be rescaled to match the field-of-view captured by the second camera. Following the rescaling, two images are present (a first rescaled sub-image that is a portion of the rescaled wide-angle image, and a second narrow-angle image) that represent the same field-of-view.

At block 660, if the first mode or the second mode was selected at block 610, the captured one or more images may be analyzed. Analyzing the images may include performing some processing on the images. Analyzing the images may include performing one or more image processing techniques to: identify one or more traffic lights present within the one or more images; determine a state of the one or more traffic lights; and/or determine probabilities that the state determination of the one or more traffic lights are correct. If the third mode was selected at block 610, the one or more images from each of the first camera and the second camera may be separately analyzed. A fusion process may be used to combine the resulting traffic light classifications. The fusion process may be performed as detailed in the previously incorporated-by-reference "Fusion-Based Traffic Light Recognition for Autonomous Driving" Application. The fusion process may involve combining the probabilistic likelihood of each possible traffic light state being correct based on various weighting arrangements.

At block 670, the vehicle may be driven at least partially based on the identified traffic light and/or the state of the traffic light (and, possibly, probability of the state being correct) determined at block 660. Block 670 can include autonomous driving system 110 controlling one or more vehicle system 170 through vehicle control interface 150, such as to brake and stop before an intersection (e.g., if red is the determined state of the traffic light) or continue to move into and through an intersection (e.g., if green is the determined state of the traffic light).

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for imaging a traffic light, the method comprising:
    determining, by an on-vehicle processing system, a distance to the traffic light, wherein the on-vehicle processing system is installed on a vehicle;
    selecting, by the on-vehicle processing system, a camera mode based on the determined distance to the traffic light;
    receiving, by the on-vehicle processing system, one or more images from one or more cameras based on the selected camera mode;
    determining, by the on-vehicle processing system, a state of the traffic light within the one or more received images; and
    driving, by the on-vehicle processing system, the vehicle based on the determined state of the traffic light.

2. The method for imaging the traffic light of claim 1, the method further comprising:
    causing, by the on-vehicle processing system, a first camera to be supplied with power based on the selected camera mode; and
    causing, by the on-vehicle processing system, a second camera to be disconnected from power.

3. The method for imaging the traffic light of claim 2, wherein the camera mode is selected from the group consisting of:
    a first camera mode in which a short-range camera is used as the first camera to capture the one or more images; and
    a second camera mode in which a long-range camera is used as the first camera to capture the one or more images.

4. The method for imaging the traffic light of claim 3, wherein selecting the camera mode based on the determined distance to the traffic light is based on comparing the determined distance to a stored threshold distance.

5. The method for imaging the traffic light of claim 4, wherein the long-range camera is a thirty degree field-of-view camera and the short-range camera is a sixty degree field-of-view camera.

6. The method for imaging the traffic light of claim 1, wherein the camera mode is selected from the group consisting of:
a first camera mode in which a short-range camera is used to capture the one or more images;
a second camera mode in which a long-range camera is used to capture the one or more images; and
a third camera mode in which the long-range camera and the short-range camera are used to capture the one or more images.

7. The method for imaging the traffic light of claim 6, wherein selecting the camera mode based on the determined distance to the traffic light is based on comparing the determined distance to a first stored threshold distance and a second stored threshold distance.

8. The method for imaging the traffic light of claim 7, wherein:
the third camera mode is selected when the determined distance is between the first stored threshold distance and the second stored threshold distance; and
the determined distance is between the first stored threshold distance and the second stored threshold distance.

9. The method for imaging the traffic light of claim 8, further comprising:
based on the third camera mode being selected, rescaling, by the on-vehicle processing system, a first image of the one or more images captured using the short-range camera to match a region included in a second image of the one or more images captured using the long-range camera.

10. The method for imaging the traffic light of claim 9, wherein determining the state of the traffic light within the one or more images comprises:
analyzing the rescaled first image of the one or more images to determine the state of the traffic light; and
analyzing the second image of the one or more images to determine the state of the traffic light.

11. The method for imaging the traffic light of claim 10, wherein determining the state of the traffic light within the one or more images further comprises:
performing, by the on-vehicle processing system, a fusion process based on the state of the traffic light based on analyzing the rescaled first image and the state of the traffic light based on analyzing the second image.

12. A system for imaging a traffic light, the system comprising:
a short-range camera having a first field-of-view, wherein the short-range camera is installed on a vehicle;
a long-range camera having a second field-of-view that is narrower than the first field-of-view, wherein the long-range camera is installed on the vehicle and the first field-of-view overlaps the second field-of-view; and
an on-vehicle processing system, comprising one or more processors, that receives images from the short-range camera and the long-range camera, wherein the on-vehicle processing system is configured to:
determine a distance to the traffic light, wherein the on-vehicle processing system is installed on the vehicle;
select a camera mode based on the determined distance to the traffic light;
receive one or more images from the long-range camera, the short-range camera, or both based on the selected camera mode;
determine a state of the traffic light within the one or more received images; and
cause the vehicle to be driven based on the determined state of the traffic light.

13. The system for imaging the traffic light of claim 12, wherein the on-vehicle processing system is further configured to:
cause the short-range camera to be supplied with power based on the selected camera mode; and
cause the long-range camera to be disconnected from power.

14. The system for imaging the traffic light of claim 13, wherein the camera mode is selected from the group consisting of:
a first camera mode in which the long-range camera is used to capture the one or more images; and
a second camera mode in which the short-range camera is used to capture the one or more images.

15. The system for imaging the traffic light of claim 14, wherein selecting the camera mode based on the determined distance to the traffic light is based on comparing the determined distance to a stored threshold distance.

16. The system for imaging the traffic light of claim 15, wherein the long-range camera is a thirty degree field-of-view camera and the short-range camera is a sixty degree field-of-view camera.

17. The system for imaging the traffic light of claim 12, wherein the camera mode is selected from the group consisting of:
a first camera mode in which the long-range camera is used to capture the one or more images;
a second camera mode in which the short-range camera is used to capture the one or more images; and
a third camera mode in which the long-range camera and the short-range camera are used to capture the one or more images.

18. The system for imaging the traffic light of claim 17, wherein selecting the camera mode based on the determined distance to the traffic light is based on the on-vehicle processing system being configured to compare the determined distance to a first stored threshold distance and a second stored threshold distance.

19. The system for imaging the traffic light of claim 18, wherein:
the third camera mode is selected when the determined distance is between the first stored threshold distance and the second stored threshold distance; and
the determined distance is between the first stored threshold distance and the second stored threshold distance.

20. The system for imaging the traffic light of claim 19, wherein the on-vehicle processing system is further configured to:
rescale a first image of the one or more images captured using the short-range camera to match a region included in a second image of the one or more images captured using the long-range camera based on the third camera mode being selected, wherein the on-vehicle processing system being configured to determine the state of the traffic light within the one or more images comprises the on-vehicle processing system being configured to:
analyze the rescaled first image of the one or more images to determine the state of the traffic light; and analyze the second image of the one or more images to determine the state of the traffic light.

\* \* \* \* \*